United States Patent

[11] 3,604,294

| [72] | Inventor | Archibald S. Mitchell |
| | | East Detroit, Mich. |
| [21] | Appl. No. | 881,729 |
| [22] | Filed | Dec. 3, 1969 |
| [45] | Patented | Sept. 14, 1971 |
| [73] | Assignee | La Salle Machine Tool, Inc. |
| | | Warren, Mich. |

[54] TWO DIRECTIONAL TOOL ADJUSTING APPARATUS
6 Claims, 5 Drawing Figs.

| [52] | U.S. Cl. | 82/24 |
| [51] | Int. Cl. | B23b 21/00 |
| [50] | Field of Search | 82/24 |

[56] References Cited
UNITED STATES PATENTS

| 2,632,332 | 3/1953 | Biggert | 82/24 X |
| 3,136,190 | 6/1964 | Musy | 82/24 |

*Primary Examiner*—Leonidas Vlachos
*Attorney*—Olsen and Stephenson

ABSTRACT: Apparatus for periodically adjusting the position of a machine tool, such as a cutting tool, to compensate for tool wear and changing heat conditions, for example, to enable continuous accurate positioning of the tool. In response to a signal indicating the necessity for adjusting the position of the cutting tool, a cam and cam follower structure are movable in either of two opposite directions to provide for adjustable movement of the tool in either of two directions through a predetermined incremental distance. A clutch and brake assembly are sequentially operable to enable reversible adjustable movement of the tool. In addition, a manually rotatable shaft is operable to reset the cam and cam follower structure to a zero position.

PATENTED SEP 14 1971

INVENTOR
ARCHIBALD S. MITCHELL

BY

Olsen and Stephenson
ATTORNEYS

INVENTOR
ARCHIBALD S. MITCHELL

BY
*Olsen and Stephenson*
ATTORNEYS

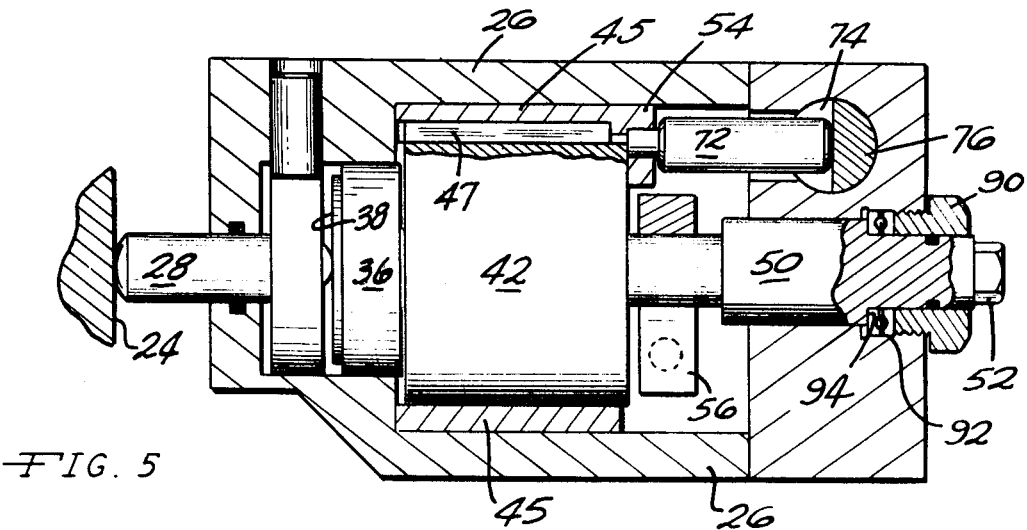
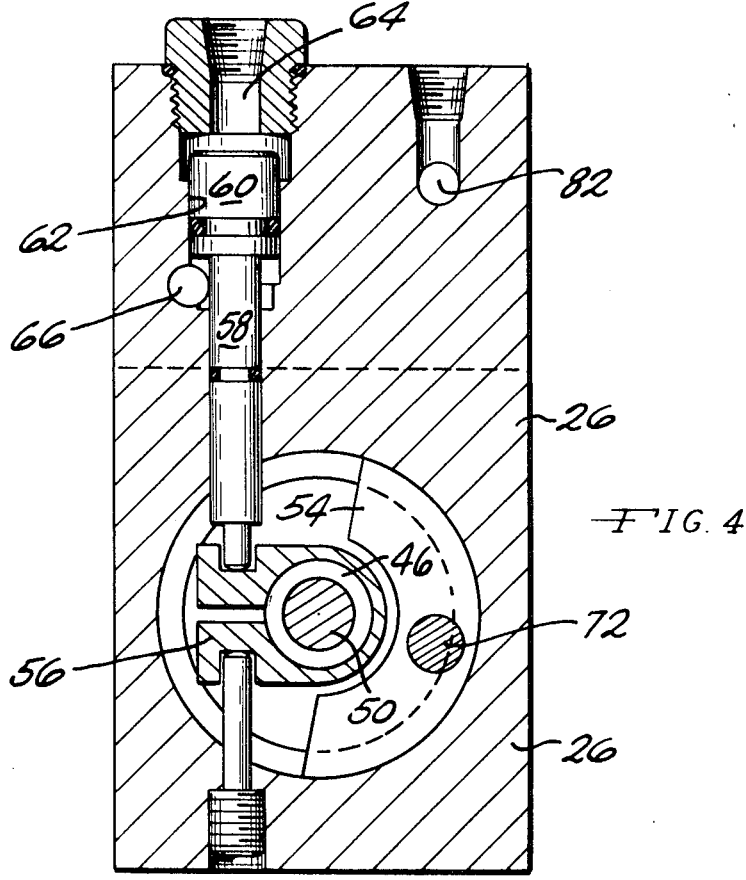
INVENTOR
ARCHIBALD S. MITCHELL
BY
*Olsen and Stephenson*
ATTORNEYS 3,604,294

TWO DIRECTIONAL TOOL ADJUSTING APPARATUS

CROSS REFERENCE TO RELATED APPLICATION

This application is an improvement of the machine tool resetting apparatus disclosed in copending application Ser. No. 759,081 filed Sept. 11, 1968 and assigned to the assignee of this application.

BACKGROUND OF THE INVENTION

In machines where a tool, such as a cutting or turning tool, is set to continuously machine like parts to predetermined dimensions, periodic automatic adjustment of the tool position is desirable. The general practice in the past has been to manually measure, at periodic intervals, workpieces which have been subjected to the operation of the tool. When a workpiece was outside allowable tolerance limits, the machine was shut down and the position of the tool was manually adjusted to bring subsequently machined parts within the allowable tolerances. This manual adjustment procedure is objectionable for many reasons including the necessity for shutting the machine down. The aforementioned copending application discloses machine tool resetting apparatus operable to adjust the tool position in one direction only. Conditions such as changing heat conditions sometimes make it desirable to adjust the tool position in two directions. This application relates to an improved structure enabling automatic adjustment of the tool position in either of two directions and in addition enables manual resetting of the tool adjusting cam and cam follower structure to a zero position.

SUMMARY OF THE INVENTION

In the improved tool adjusting apparatus of this invention the cutting tool is mounted on a support which is partially split so that it has a fixed section and a section which can be deflected relative to the fixed section. The tool is mounted on the deflectable section so that deflection of this section provides for movement of the tool either toward or away from the work. The apparatus includes a fixed body and a plunger mounted on the body and engaged with the deflectable tool support section. The plunger is mounted for axial sliding movement so that when the plunger is advanced it will deflect the deflectable support section toward the work, and when the plunger is retracted the spring inherent in the tool support section will move the tool away from the work. A spindle is rotatably mounted on the fixed body and coacting cam and cam follower means are provided on the spindle and the plunger so that in response to rotation of the spindle the plunger is advanced or retracted depending on the direction of rotation of the spindle. An indexable drive is mounted in the fixed body and a reverse locking clutch and brake assembly are associated with the spindle so that the spindle can be rotated in reversible directions. Further, a manually rotatable shaft is associated with the clutch so that on rotation of the shaft the cam and cam follower structure can be reset to a zero position.

As a result, the tool positioning apparatus of this invention enables automatic movement of the tool toward or away from the work and in addition enables easy resetting of the tool apparatus to a zero position when desired. Further objects, features and advantages of this invention will become apparent from a consideration of the following description, the appended claims, and the accompanying drawing in which:

FIG. 4 is a transverse sectional view of the apparatus of this invention as seen from the line 4—4 in FIG. 3; and FIG. 5 is a sectional view of the apparatus of this invention as seen from substantially the line 5—5 in FIG. 1.

Figure 1:
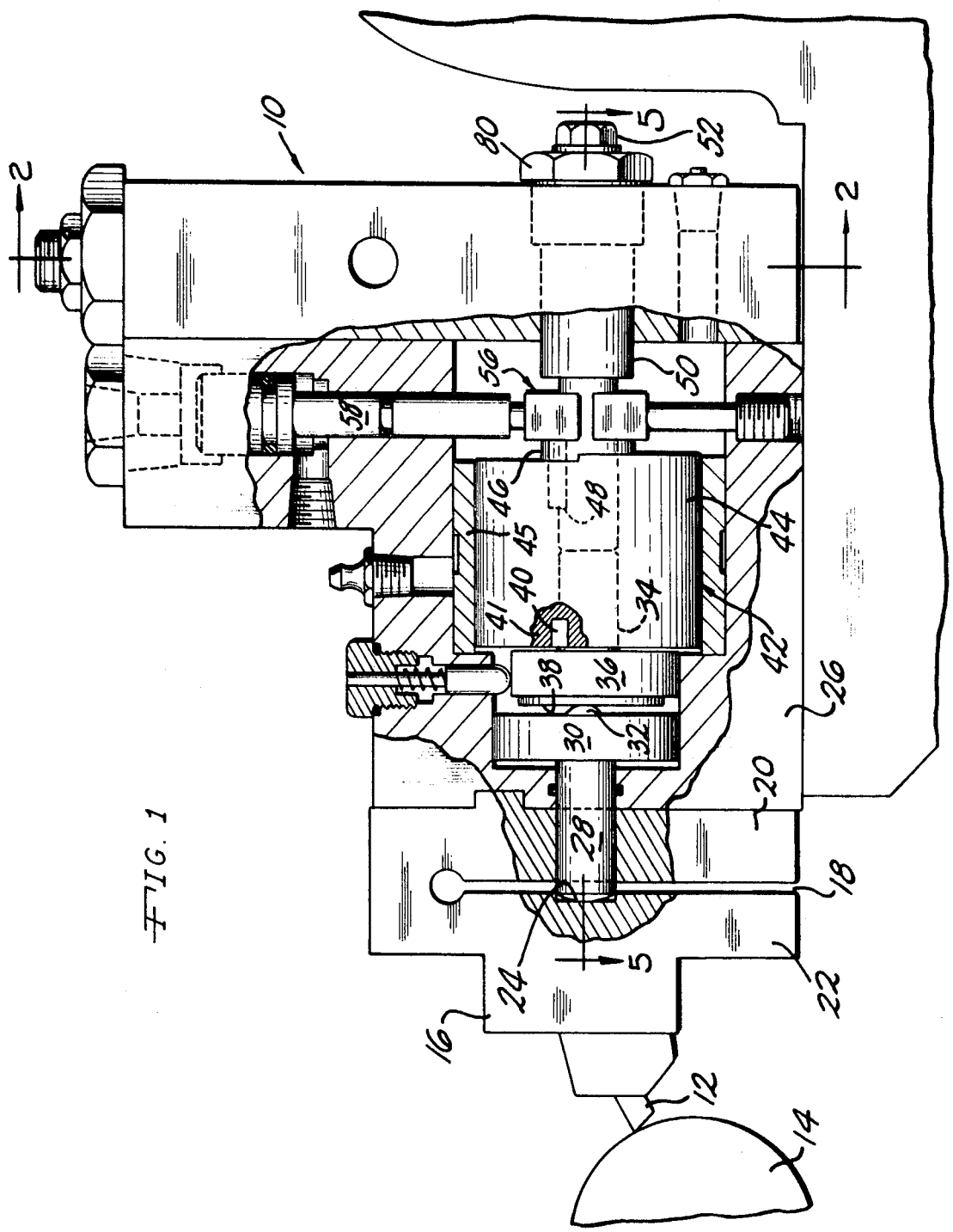
FIG. 1 is a side elevational view of the apparatus of this invention with some parts broken away and other parts shown in section for the purpose of clarity.
Figure 3:
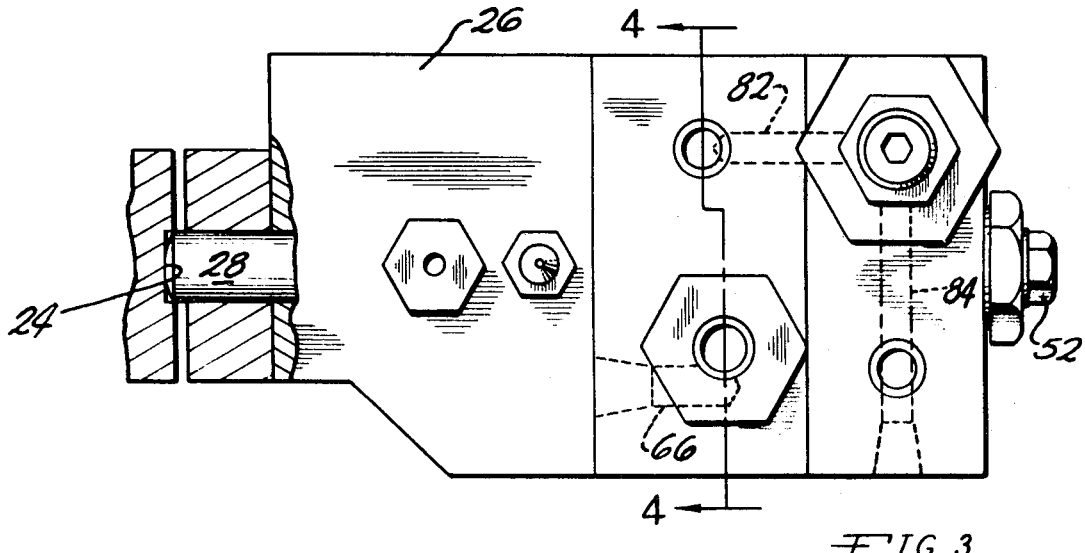
FIG. 3 is a top view of the apparatus of this invention with some parts broken away and other parts shown in section for the purpose of clarity.

With reference to the drawing, the apparatus of this invention, indicated generally at 10, is illustrated in FIG. 1 in assembly relation with a cutting tool 12 positioned for turning a workpiece 14 and mounted on a support 16. As shown in FIG. 1, the support 16 is partially split by a slot 18 so that it has a fixed section 20 and a deflectable or movable section 22 having an abutment surface 24. The apparatus 10 includes a fixed body 26 secured to the fixed support section 20 and a plunger 28 which is slidably supported in the body 26 and engaged at its outer end with the abutment surface 24. At its inner end, the plunger 28 has an enlarged section 30 which is generally cylindrical but is nonrotatable in the body 26 and is provided on one face with a cam follower 32.

A spindle 34 has an enlarged section 36 formed on one face with a cam 38 positioned in engagement with the follower 32 so that on rotation of the cam 38 the follower 32 is moved axially of the plunger 28 to in turn provide for for axial movement of the plunger 28. The spindle 34 is secured by a key 40 to the inner race 41 in a conventional two-way reverse locking clutch 42 which includes an outer race member 44. A special drive member 45 which is rotatable supported in the body 26 is secured by a key 47 (FIG. 5) to the outer race 44. A control member 46, secured by a key 48 to a shaft 50 that is axially aligned with the spindle 34, is also secured to the inner race in the clutch 42. When the control member 46 is rotated, in either direction, the clutch 42 operates through the key 40 to rotate the spindle 34 in the same direction. Such rotation is obtainable either by rotating the shaft 50, which is provided with a hex head 52 to facilitate manual rotation thereof, or by rotation of a segment 54 (FIG. 4) which is an extension of the drive member 45.

A split brake member 56 (FIG. 4) is operable, on advance of a hydraulically operable plunger 58, to hold the control member 46 against rotation, for a purpose to appear presently. The plunger 58 has a piston 60 formed on one end thereof and slidably supported in a cylinder chamber 62 formed in the body 26. Fluid inlet and outlet passages 64 and 66 communicate with the chamber 62 on opposite sides of the piston 60. As a result, when fluid is admitted to the chamber 62 through the passage 64, and exhausted through the passage 66, the piston 60 is movable in a downward direction as viewed in FIG. 4 so as to apply a compressive force to the brake 56 which in turn frictionally engages the control member 46 and holds it in a fixed position. Conversely, when fluid under pressure is admitted to the chamber 62 through the passage 66, and exhausted through the passage 64, the brake 56 is released so that the control member 46 is free to rotate with clutch 42.

Figure 2:
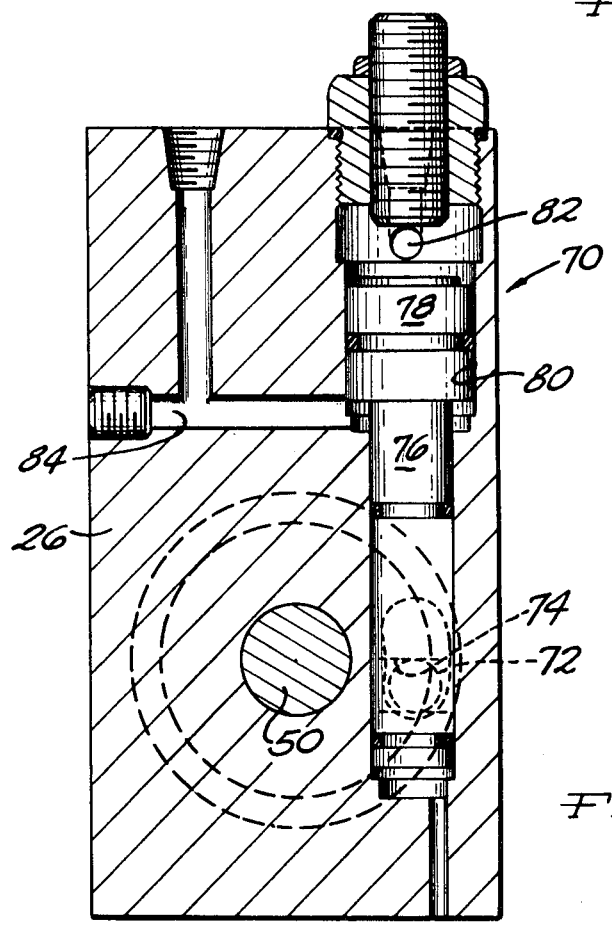
FIG. 2 is a transverse sectional view of the apparatus of this invention as seen from substantially the line 2—2 in FIG. 1.

A selectively operable clutch actuating mechanism, indicated generally at 70, (FIG. 2) is provided for actuating the clutch mechanism 42 to rotate the spindle 34 when the brake 56 is released. The mechanism 70 includes a drive pin 72 (FIG. 5) engaged with the drive member 45 and positioned in a slot 74 in a vertically movable plunger 76 formed on one end with a cylinder 78. The cylinder 78 is slidably supported in a chamber 80 formed in the body 26 and communicating with inlet and outlet passages 82 and 84. When fluid under pressure is admitted to the chamber 80 through the passage 82, and exhausted through the passage 84, the cylinder 78, and thus the plunger 76, are moved in one direction, namely, downwardly as viewed in FIG. 2. Conversely, when fluid under pressure is admitted to the chamber 80 through the passage 84 and exhausted through the passage 82, the plunger 76 is moved in the opposite direction. Whether or not rotation of the spindle 34 is obtained, in response to such movement of the plunger 76, is dependent upon whether the brake 56 is applied during the time the plunger 76 is being moved. Stated otherwise, the spindle 34 is rotated in response to movement of the plunger 76 only if the brake 56 is released during such movement. If the brake 56 is applied during movement of plunger 76, the outer race 44 merely free wheels in the clutch 42.

In the operation of the apparatus 10, the plunger 28 is initially engaged with the abutment 24 so as to deflect the deflectable tool support section 22 a distance necessary to provide for the inherent spring in the support 16 exerting a resistance force on the plunger 28 tending to retract the plunger, namely, move the plunger toward the right in FIG. 1. A preload adjusting screw 90 (FIG. 5) which is threadably supported in the body 26 abuts a thrust bearing 92 which in turn abuts a shoulder 94 on shaft 50. Thus, in response to advance of screw 90, shaft 50 and spindle 34 are advanced to advance plunger 28 and preload the tool support 16. The bearing 92 is important because it enables free rotation of shaft 50 relative to screw 90 during automatic operation of the apparatus 10.

When it is desired to move the tool 12 toward the work 14, fluid under pressure is admitted through the passage 66 to the chamber 62 so as to release the brake 56. Fluid under pressure is then admitted to the chamber 80 through the passage 82 so as to move the plunger 76 downwardly as viewed in FIG. 2. Such movement of the plunger 76 will provide for an incremental rotation of the spindle 34 to in turn provide for an incremental advance of the plunger 28 by virtue of the coaction of the cam 38 and the cam follower 32. Fluid under pressure is then admitted to the chamber 62 through the passage 64 so as to apply the brake 56 to hold the control member 46 in a fixed position. The plunger 76 is then moved upwardly by admitting fluid under pressure to the chamber 80 through the passage 84. This positions the plunger 76 in readiness for the next advance of the plunger 28 to move the tool 12 toward the work 14, since this is the usual adjustment of the tool 12 that is required. However, in the event retraction of the tool 12 is desired, the plunger 76 is again moved downwardly, while the brake 56 is applied so that the movement of the plunger 76 is ineffective to move the tool 12. The plunger 58 is then actuated to release the brake 56 and fluid is admitted to chamber 80 through passage 84 so as to move the plunger 76 upwardly as viewed in FIG. 2 to in turn provide for rotation of the spindle 34 in an opposite direction to allow the pressure force of the tool support section 22 on the plunger 28 to retract the plunger. A conventional control mechanism (not shown) associated with apparatus for gauging the work 14 provides for the automatic sequenced supply of fluid to the chambers 62 and 80 to provide the movements of the plungers 58 and 76 described above.

In order to enable manual reset of the cam surface 38 relative to the cam 32, it is only necessary to release the brake 56 and manually rotate the shaft 50 by means of a wrench, or the like, applied to the hex head 52.

From the above description, it is seen that this invention provides automatically operable apparatus 10 capable of providing for two directional adjustment of the tool 12. In addition, the provision of the shaft 50 enables manual zero reset of the plunger 28, and the preload adjusting screw 90 facilitates the necessary preloading of the tool support 16 to achieve the requisite reaction force on plunger 28.

What is claimed is:

1. In machine tool adjusting apparatus, a body, plunger means having an axis and being mounted on said body for movement back and forth along said axis, spindle means rotatably mounted in said body in a substantially coaxial relation with said plunger means, coacting means on said spindle and plunger means providing for movement of said plunger means in a direction along said axis determined by the direction of rotation of said spindle means, spindle actuating means movable in relatively reversed directions, clutch means interposed between said spindle actuating means and said spindle means, and selectively operable means for enabling said clutch to transmit movement of said spindle actuating means to said spindle.

2. Machine tool adjusting apparatus according to claim 1 wherein said spindle actuating means comprises a two directional clutch having a control member operable to accomplish rotation of said clutch means, and brake means operatively associated with said clutch means for selectively holding said control member in a fixed position.

3. Machine tool adjusting apparatus according to claim 2, further including manually operable shaft means associated with said clutch means and operable to provide for rotation of said spindle means.

4. Apparatus according to claim 1 further including a deflectable tool support engaged with said plunger means and urging said plunger means in one direction along said axis.

5. Apparatus according to claim 4 further including a preload adjusting screw operable to urge said plunger means in a direction opposite to said one direction.

6. Apparatus according to claim 5 further including shaft means extending axially through said screw and into axial abutting engagement with said spindle means, means forming a shoulder on said shaft means aligned with and spaced from said screw, and thrust bearing means disposed between said screw and said shoulder and operable to transmit axial movement of said screw into axial movement of said shaft means.